United States Patent [19]

Gras

[11] Patent Number: 4,800,049
[45] Date of Patent: Jan. 24, 1989

[54] PROCESS AND APPARATUS FOR OBTAINING PLASTIC MOLDED OBJECTS

[75] Inventor: Elie Gras, Le Ronzon, France
[73] Assignee: Anver, Maisons Alfort, France
[21] Appl. No.: 49,809
[22] Filed: May 12, 1987

[30] Foreign Application Priority Data

May 26, 1986 [FR] France .................... 86 07446

[51] Int. Cl.⁴ ............ B29C 45/06; B29C 45/20; B29C 39/42; B29C 39/38
[52] U.S. Cl. .................... 264/26; 264/337; 264/DIG. 60; 264/41; 264/54; 264/102; 264/334; 425/405.1; 425/174.8 E; 425/4 R; 425/817 R; 425/438
[58] Field of Search .......... 264/25, 26, 337, DIG. 60, 264/41, 54, 101, 102, 334; 425/405.1, DIG. 44, 174.8 R, 178.8 E, 4 R, 817 R, 438, 444; 249/134

[56] References Cited

U.S. PATENT DOCUMENTS 3,315,016  4/1967  Wersosky et al. ............... 264/25
3,865,532  2/1975  Sakuma ............................ 425/405.1
4,441,876  4/1984  Marc ............................... 425/DIG. 44

FOREIGN PATENT DOCUMENTS 0120666   9/1979  Japan ............................. 425/405.1
1006926  10/1965  United Kingdom ............... 264/26

Primary Examiner—Willard Hoag
Attorney, Agent, or Firm—Browdy & Neimark

[57] ABSTRACT

A process and an apparatus obtain plastic molded objects according to a technique which consists of introducing the plastic into a silicone elastomer mold, then inserting this mold into a high frequency device comprising a turntable "carrousel", a series of high frequency heating presses and a cooling device.

The process is characterized by the introduction of plastic into one end of the mold in the form of liquid plastisol under low pressure, i.e., less than 1 Magapascal. The apparatus employs a carrousel, a mold having two male inserts and resting on the carrousel, vacuum-creating means and plastisol injection means.

16 Claims, 2 Drawing Sheets

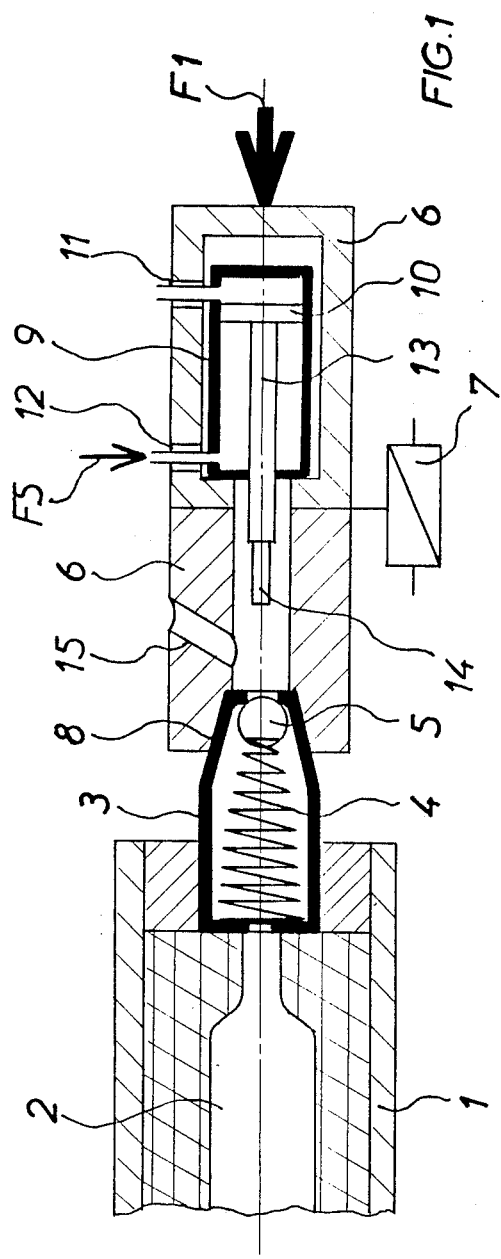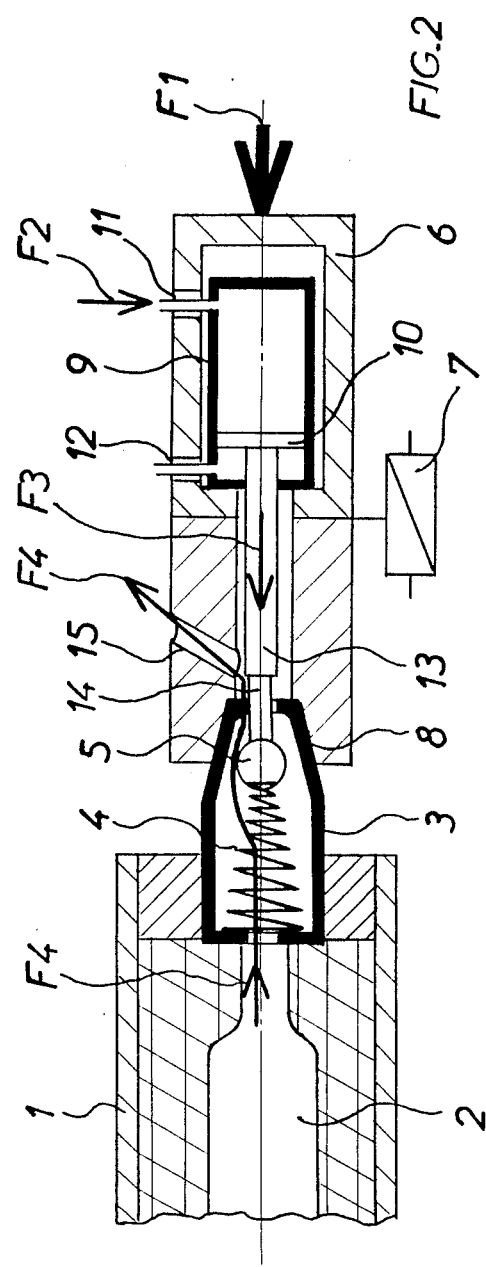

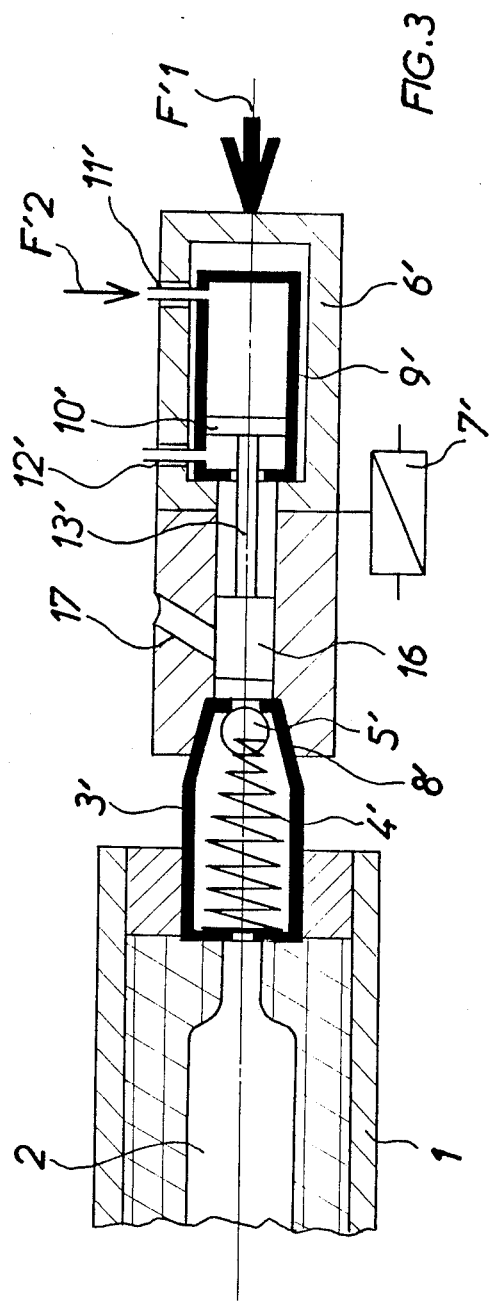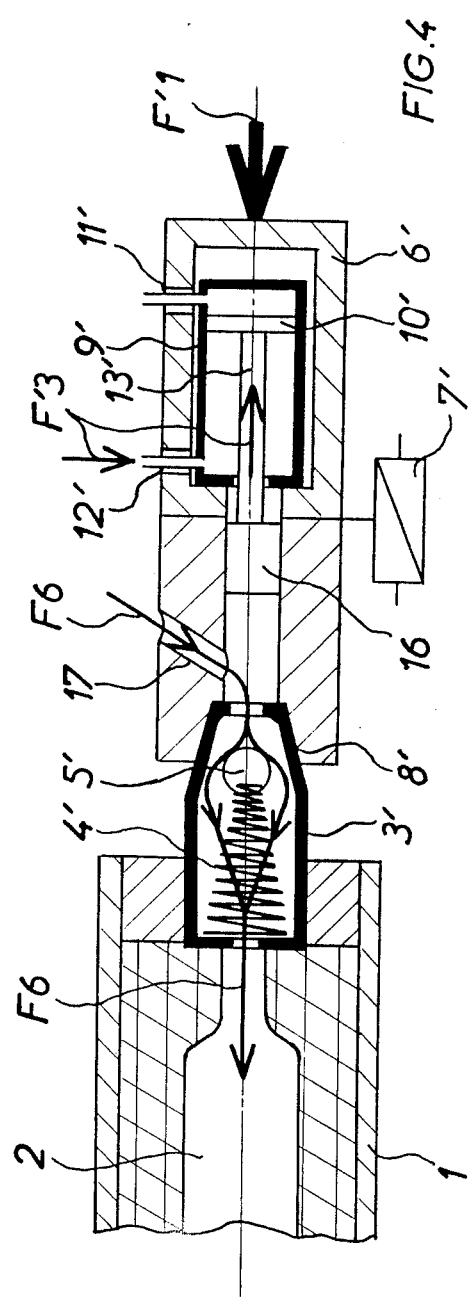

PROCESS AND APPARATUS FOR OBTAINING PLASTIC MOLDED OBJECTS

BACKGROUND OF THE INVENTION a. Field of the Invention

This invention concerns the field of pressurized high frequency heating of plastic molded objects with the material placed in a hollow mold equipped with raised patterns corresponding to the designs to be obtained on the objects in question. It especially concerns improvements in the technique for molding in molds of silicone elastomers, as well as a device for injection molding adapted to high frequency heating press equipment.

b. Description of the Prior Art

Various molded objects, for example, the components of quarters and vamps for shoes, fancy leather goods or other items, are produced by filling the hollow parts of a mold constituting negatives of the design to be reproduced with a plastic material such as polyvinyl chloride in powder or liquid form. Then, after possible application on the mold of a material which will constitute the lining, the sandwich assembly is exposed to high frequency (HF) heating, under pressure, after which a cooling makes it possible to obtain an instanteous mold stripping of the formed plastic object. Such a technique, with its different variants, as well as the appropriate equipment, has already been described in a series of patents owned by the present assignee.

It is known that by submitting a dielectric material, for example, a macromolecular plastic, to current whose frequencies correspond to the molecular resonance of the material in question, one obtains a heating due to dielectric losses. For example, in this technique, one generally submits polyvinyl chloride powder (PVC) to frequencies of approximately 27 megacycles or more, under pressure, in molds of silicone elastomer, to obtain, in less than on minute, shaped objects, corresponding to the designs of the mold. In practice, the mold is built using a mixture of silicone with a metal powder, such as aluminum, in order to provide a better distribution of the high frequency field and to enable a better cooling of the molded PVC.

Various types of molds especially adapted to this technique have been proposed by the present assignee, particularly including molds in which the pure resin is more or less filled, in certain constituants, with metal powder or with an equivalent material (French Pat. No. 78.32827, 78.33917 and 79.06692), or molds which can receive at least a metal insert (French patent No. 80.03658).

For molding according to the technique reviewed above, the plastic material (PVC or other) is introduced in the form of powder or it may be poured in the form of liquid plastisol into the hollow parts of the silicone mold, with or without metal insert. Upon initial examination, it could not be expected that injection molding could be used because it would require the use of metal molds under very high pressures, often from 10 to 50 megapascals (MPa).

SUMMARY OF THE INVENTION

It has now been found that with molds and with HF equipment with presses as described above, it is possible to directly obtain molded objects, using plastisol liquid, under excellent technical and economic conditions, according to the process consisting of injecting the plastisol, at one end of the mold, under low pressure, less than 1 MPa, and, preferably, from 0.1 to 0.5 MPa.

According to an advantageous configuration, but not the only one possible, during the above specified injection, a suction is applied to the other end of the mold, creating a slight vacuum, for example from 0.01 to 0.05 MPa.

All plastics in plastisol form can be used according to the process, including, for example, those based on polyvinyl chloride or its copolymers, or, two component polyurethanes. It is also possible to transform the plastisol in advance into socalled mechanical foam, by beating or any other analogous method, to obtain a microporous molded object, and this foam may contain a foaming agent.

The molds which can be used which are of the silicone elastomer resin, with parts of pure resin and other parts of resin filled with metal powder (or made based on aluminum foundry items), are the same type as those described in the patents mentioned above.

It is judged to be particularly advantageous to place into such molds metal inserts such as grids or sections which can be combined with clips or analogous items, the molds then being fitted with recesses which make it possible to fasten the inserts on the outside.

Another aspect of the invention is a system for implementing the process which has just been described by using an injection apparatus especially adapted for molding using HF equipment with heating and cooling. This system has a turntable or "carrousel": on which are mounted the molds which are successively subjected to a heating and a cooling, and it can be of the type described in French patent No. 75,27466 of the requesting company.

According to the invention, this system is characterized by the fact that each of the molds used communicates, at its end opposite the "carrousel", with a vacuum nozzle and with a pressurized plastic injection nozzle which is integrated with the mold, and it is characterized by the fact that it includes a vacuum creating cylinder and a pressurized plastic injection cylinder as well as the equipment for moving the cylinders with the access of the nozzles in order to be able to bring them into communication with the latter and then separate them.

This system, after having brought a mold into the appropriate position by turning the "carrousel", makes it possible to apply respectively the cylinders for pressurizing and plastic injection on the corresponding nozzles of the mold, to create the vacuum in the mold, to fill it with plastic under pressure, and, finally, to separate the cylinders in question to be able to fill a new mold after turning the "carrousel". By an advantageous configuration of this system, the mold nozzles are male nozzles whose end opposite the mold is tapered and which contains a ball, exerted by a compression spring against their outlet opening, the extremity facing the vacuum-creating and injection cylinders forming a tapered female nozzle, which fits in a leaktight way onto the corresponding male nozzle.

The vacuum-creating cylinder preferably includes an opening linking its inside cavity to an outside device for creating vacuum. However, at the same time, in injection has an opening connecting its inside cavity to an outside device for injecting plastic under pressure.

To their advantage, these openings are located between the end of the corresponding cylinder which is facing the mold and a double action positioning cylinder fitted with pressurized air inlet openings on either side of a piston whose rod is toward the female nozzle of the cylinder which it extends, for the vacuum-creating cylinder, by one part whose diameter enables it to penetrate into the corresponding male nozzle outlet, and, for the injection cylinder, by a sealing cylinder which plugs the plastic injection opening which this cylinder includes, as explained above.

It will be explained further on in a more detailed way that this system makes it possible to create the vacuum in the mold when the above specified rod, under the effect of the positioning cylinder, pushes back the ball which covers the outlet opening into the inside of the male nozzle, which places the mold cavity in communication with the corresponding cylinder vacuum creating opening, and when the outside air suction device connected to this orifice is started up.

This device also makes it possible to inject plastic under pressure, after the creation of the vacuum, when the positioning cylinder piston is found in a position such that the above specified sealing frees the injection opening; the pressurized plastic causes this injection opening and a part of the cylinder to penetrate into the male nozzle and into the actual mold after having pushed back the ball which is plugging the outlet opening of the male injection nozzle.

BRIEF DESCRIPTION OF THE DRAWINGS

The description which is going to follow, and which does not necessarily include all the possibilities, will make it possible to properly understand how this invention can be placed into practice. It should be read with reference to the appended drawings, and among these drawings are the following:

FIGS. 1 and 2 represent an overall axial cross-sectional view of the creation of the vacuum according to the invention during the two successive phases of its operation; and:

FIGS. 3 and 4 represent, also in axial cross-sectional view, the overall injection according to the invention during two successive phases of its operation.

DETAILED DESCRIPTION OF THE PREFERRED EMBODIMENT

The system according to the invention first of all comprises, in a conventional way as described in French patent no. 75.27466, a turntable or "carrousel", which is not shown, upon which rest the molds which are successively subjected to heating and to cooling by appropriate turning of the "carrousel". In one of the positions of the latter, one of the molds is filled with plastic; it is this mold whose extremity, turned toward the outside of the "carrousel", or "front extremity", is shown at 1 on the figures.

Cavity 2 of this mold opens out into two identical nozzles, located in a single horizontal plane, one of which, 3, is designed for its placing under vacuum (FIGS. 1 and 2), and the other, 3', (FIGS. 3 and 4) is designed for injecting the plastic into the mold. Nozzles 3 and 3' are male cylindrical nozzles with tapered ends which are integrated with the spring 4, respectively 4', exerting a ball 5, respectively 5', against the terminal opening at the front of the corresponding nozzle.

A vacuum creating cylinder 6 can slide along the axes of the system thanks to a conventional type slide connection represented very roughly at 7, and its female tapered extremity 8, turned toward nozzle 3 can come and be applied in a leaktight way against the corresponding male extremity of nozzle 3. Cylinder 6 holds a double action positioning cylinder 9 in which come out, on either side piston of 10, air inlet and outlet openings 11 and 12. Piston 10 is integrated with a rod 13 which moves out in the direction of nozzle 3 and whose extremity 14 presents a diameter such that it can pass through the terminal opening of that nozzle. A vacuum-creating opening 15, leaktight with relation to positioning cylinder 9, crosses the wall of cylinder 6 at the level of rod 14 and, toward the outside, it is connected to a conventional apparatus for creating vacuum.

The operation of this vacuum-creating system is as follows: cylinder 6 is pushed toward nozzle 3 (arrow $F_1$) until the end of the latter is covered and sealed by the female end 8 of cylinder 6 (FIG. 1). Pressurized air is then introduced through opening 11 of positioning cylinder 9 (arrow $F_2$, FIG. 2), which pushes piston 10 toward nozzle 3 (arrow $F_3$), extremity 14 of its rod 11 penetrating into the latter to push back ball 5 in contact with spring 4. A vacuum is created in cavity 2 of the mold through opening 14 by means of a suction device such as a vacuum pump which is not shown (arrow $F_4$). Finally pressurized air is introduced through opening 12 of positioning cylinder 9 (arrow $F_5$figure 1); piston 10 comes back to its initial position and ball 5 is applied against the front opening of nozzle 3, which makes it possible to maintain the vacuum in cavity 2.

At the same time, injection nozzle 3' (FIGS. 3 and 4) can be fitted (arrow $F_1'$) onto the female end of a cylinder 6' which is almost identical to cylinder 6 which is used for creating vacuum. In order that analogous mechanisms of these two cylinders will be designated by the same reference, assigned however with an index, in this case, of cylinder 6'. Thus, there is a slide connection 7', a positioning cylinder 9' with openings 11' and 12', as well as a piston 10' and its rod 13'. This rod, however, ends with a sealing cylinder 16 which can come and adjust itself closely onto an opening 17 whose position corresponds to the position of opening 15 of cylinder 6, but which is designed for injecting pressurized plastic.

This unit is started up immediately after the end of the operating cycle of cylinder 6 which creates vacuum. After having introduced pressurized air through opening 11' of positioning cylinder 9' (arrow $F_2'$), which pushes back piston 10' toward nozzle 3' and brings sealing cylinder 16 of its rod 13' into closing position on opening 17 (FIG. 3), cylinder 6' is shifted to bring its female end 8' to fit tightly the male nozzle 3' (arrow $F_1'$).

In a second phase (FIG. 4), piston 10, is shifted in the opposite direction by introducing pressurized air through opening 12' of positioning cylinder 9' (arrows $F_3'$), which frees opening 17 and makes it possible to inject pressurized plastic there (arrows $F_6'$), the latter pushing back ball 5' into nozzle 3' and being able in this way to penetrate into cavity 2 of the mold. Once the injection is completed, the situation of FIG. 3 is returned to by acting on piston 10'. The process is finished by moving apart the nozzles corresponding to cylinders 6 and 6', which are preferably installed on a shared frame. The following mold can then be filled after an appropriate turning of the carrousel.

What is claimed is:

1. A method of producing plastic molded objects, comprising the steps of :
    positioning a mold having a first opening at a first end thereof, and a second opening at a second end opposite said first end, on a turntable, and said first and second openings of said mold each having a male insert ;

positioning said turntable so that said first end of said mold faces a female end of vacum-creating means, said female end of said vacuum-creating means being adapted to sealingly receive said male insert of said first opening, and said second end of said mold faces a female end of a plastisol injection means, said female end of said plastisol injection means being adapted to sealingly receive said male insert of said second opening ;

inserting said male insert of said first opening into said female end of said vacuum-creating means creating a vacuum at slightly less than atmospheric pressure within said mold through said male insert of said first opening ;

removing said male insert of said first opening from said female end of said vacuum-creating means while maintaining said vacuum within said mold ;

inserting said male insert of said second opening into said female end of said plastisol injection means ;

filling said mold by injecting a liquid plastisol at a pressure of less than 1 Mpa from said plastisol injection means through said male insert of said second opening and into said mold while maintaining said vacuum within said mold ;

subjecting said filled mold to high frequency heating and pressure ;

removing said male insert of said second opening from said female end of said plastisol injection means ;

cooling said filled and heated mold to form a plastic molded object ; and removing said plastic molded object from said mold.

2. The method of claim 1, wherein said injection pressure is 0.1 to 0.5 MPa.

3. The method of claim 1, wherein said vacuum is applied at 0.01 to 0.05 MPa.

4. The method of claim 1, wherein said selected mold is made of a silicone elastomer resin filled with metal powder.

5. The method of claim 1, wherein said plastisol comprises polyvinyl chloride or a two component polyurethane.

6. Apparatus for producing plastic molded objects, comprising:

a mold having a first opening at a first end thereof;

means for filling said mold by injecting a liquid plastisol into said first opening at a pressure of less than 1 MPa;

means for subjecting said filled mold to high frequency heating and pressure;

means for effecting cooling of said filled and heated mold to form a plastic molded object; and means for effecting removal of said plastic molded object from said mold, wherein said mold has a second opening at a second end opposite said first end, said mold resting on a turntable, and said first and second openings of said mold each have a male insert, said apparatus further comprising:

means for positioning said turntable so that said first end of said mold faces a female end of vacuum-creating means, said female end of said vacuum-creating means being adapted to sealingly receive said male insert of said first opening, and said second end of said mold faces a female end of a plastisol injection means, said female end of said plastisol injection means being adapted to sealingly receive said male insert of said second opening;

means for inserting said male insert of said first opening into said female end of said vacuum-creating means and creating a vacuum within said mold through said male insert of said first opening;

means for removing said male insert of said first opening from said female end of said vacuum-creating means while maintaining said vacuum within said mold;

means for inserting said male insert of said second opening into said female end of said plastisol injection means;

means for performing said injecting step by injecting said liquid plastisol from said plastisol injection means through said male insert of said second opening and into said mold while maintaining said vacuum with said mold; and means for removing said male insert of said second opening from said female end of said plastisol injection means.

7. Apparatus according to claim 6 wherein said mold is made of a silicone elastomer resin filled with metal powder.

8. Apparatus according to claim 6 further comprising means for applying vacuum at slightly less than atmospheric pressure to said mold during said injection.

9. Apparatus according to claim 8 wherein said means for applying vacuum comprises a pump to apply vacuum at 0.01 to 0.05 MPa.

10. An apparatus for producing a molded plastic object, comprising;

a mold having a first end fitted with a first male insert and a second end opposite said first end, said second end being fitted with a second male insert;

a rotatable turntable upon which said mold rests;

a vacuum-creating means for creating a vacuum positioned outside said turntable, said vacuum-creating means having a female end on the same horizontal plane as said first male insert, said female end of said vacuum-creating means being adapted to sealingly receive said first male insert when said turntable is oriented so that said first male insert faces said female end of said vacuum-creating means;

a plastisol injection means for injecting plastisol, positioned outside said turntable, said plastisol injection means having a female end on the same horizontal plane as said second male insert, said female end of said plastisol injection means being adapted to sealingly receive said second male insert when said first male insert is facing said female end of said vacuum-creating means;

means for inserting said first male insert into said female end of said vacuum-creating means so as to place said vacuum-creating means in communication with said mold through said first male insert;

means for inserting said second male insert into said female end of said plastisol injection means so as to place said plastisol injection means into communication with said mold through said second male insert;

means for removing said first male insert from said female end of said vacuum-creating means; and means for removing said second male insert from said female end of said plastisol injection means.

11. The apparatus of claim 10, further comprising means for rotating said turntable.

12. The apparatus of claim 10 wherein said plastisol injection means and said vacuum-creating means each define a chamber housing a cylinder with a reciprocable sliding piston connected to a rearward end of a rod, a forward end of said rod facing said female end, said cylinder, being within a rearward part of said chamber; and said male inserts each have a terminal portion inwardly tapered in a direction away from said mold, a terminal opening at an end of said terminal portion opposite said mold, and axially movable ball within said terminal portion of sufficient size to seal said terminal opening when said ball is pressed thereagainst, and biasing means within said terminal portion for biasing said ball against said opening.

13. The apparatus of claim 12, wherein said biasing means comprises a spring.

14. The apparatus of claim 12, wherein said forward part of said vacuum-creating means defines a passage in fluid communication with said chamber and a source of vacuum pressure, and said forward part of said plastisol injection means defines a passage in fluid communication with said chamber and a source of pressurized liquid plastisol, said forward end of said rod of said vacuum-creating chamber being insertable within and narrower than said terminal opening of said first male insert, thus defining a means for axially moving said ball toward the middle of said mold against a force generated by said biasing means in said terminal end of said first male insert, said forward end of said rod of said plastisol injection means defining a means for opening and a means for closing said passage in said plastisol injection means in response to the axial position of said piston within said cylinder, said source of pressurized liquid plastisol being at a pressure sufficient to axially move said ball in said terminal end of said second male insert toward the middle of said mold against a force generated by said biasing means in said second male insert when said passage in said plastisol injection means is open.

15. The apparatus of claim 14, wherein said cylinders are each fitted with a pressurized fluid inlet and a pressurized fluid outlet on opposite sides of said piston.

16. The apparatus of claim 15, wherein said means for inserting said first male insert into said female end of said vacuum-creating means comprises a slide connected to said vacuum-creating means and said means for injecting said second male insert into said female end of said plastisol injection means comprises a slide connected to said plastisol injection means.

* * * * *